UNITED STATES PATENT OFFICE.

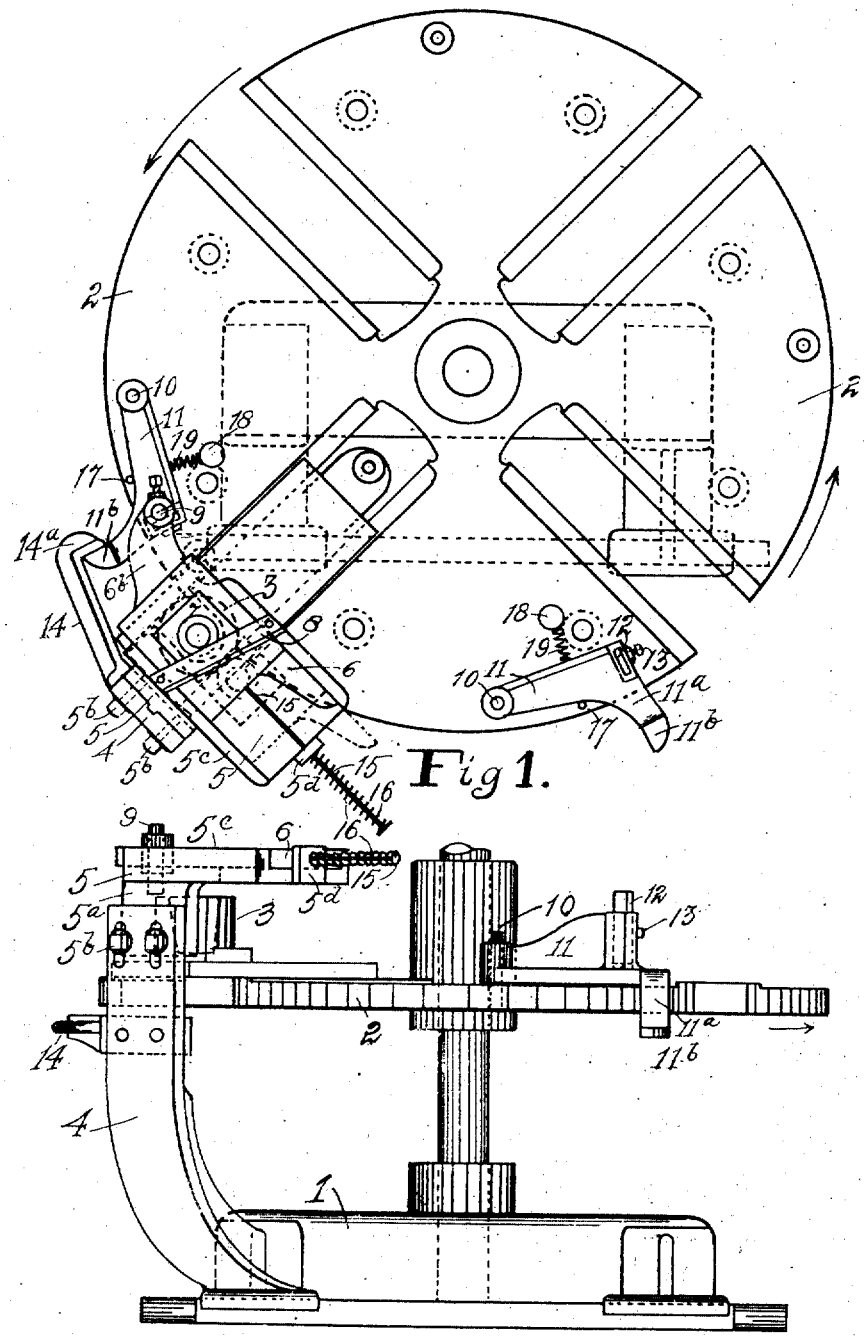

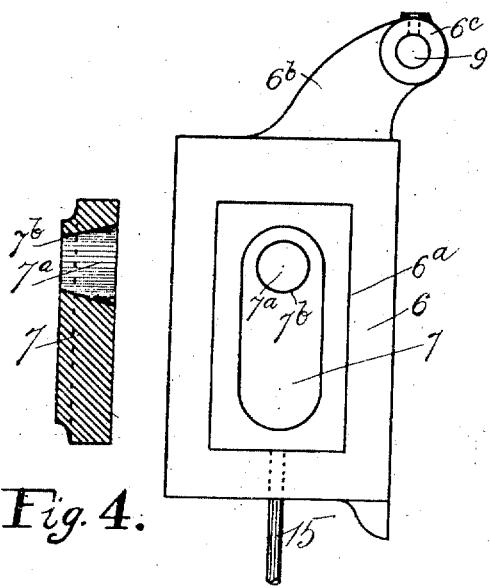
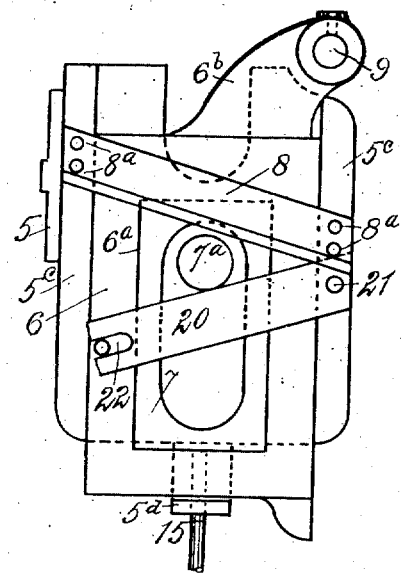
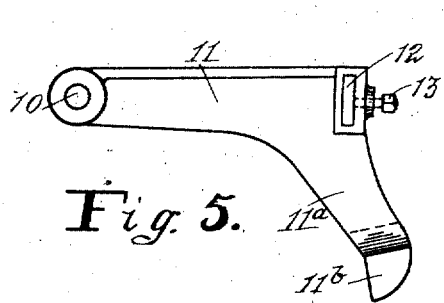
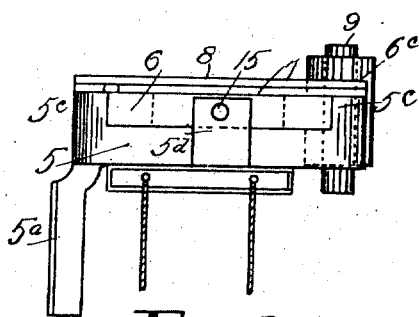

NOBLE W. HARTMAN, OF TOLEDO, OHIO, ASSIGNOR OF ONE-HALF TO GEORGE W. BURKHART, OF DETROIT, MICHIGAN.

GLASS-CUTTING-OFF MACHINE.

1,002,397.   Specification of Letters Patent.   Patented Sept. 5, 1911.

Application filed February 8, 1909. Serial No. 476,654.

*To all whom it may concern:*

Be it known that I, NOBLE W. HARTMAN, a citizen of the United States, residing at Toledo, in the county of Lucas and State of Ohio, have invented certain new and useful Improvements in Glass-Cutting-Off Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

In the manufacture of glass articles in molds, the glass, in semi-molten, plastic condition, is ordinarily gathered on the end of a gathering iron or "punty-iron"; the end of the iron is now placed in the mouth of the mold; the requisite amount of glass is cut off and charged into the mold, and is then pressed by means of any of the various devices appropriate for that purpose. Some of the objections to this method of cutting off glass are that the services of a workman are required to do the cutting off, and that the quantity of glass charged into the molds is not uniform.

My invention relates to and its object is to provide means for overcoming the difficulties here indicated, and, more particularly, to furnish devices for mechanically and automatically cutting off and charging into glass-molds the proper amount of glass.

My device is found to be especially well adapted for use in connection with the kind of glass-pressing machine patented to me in United States Letters Patent of September 12, 1905, Number 799,332, and may be advantageously used in connection with the common punty-iron.

I attain the objects above referred to by means of the devices and arrangement of parts hereinafter described, and shown and illustrated in the accompanying drawings, in which—

Figure 1 is a top-plan view of a revolving mold-carrying table and my cutting off mechanism, together with the tripping mechanism hereinafter referred to; Fig. 2, a side elevation of the same; Fig. 3, a top-plan view of the shear-plate carrier hereinafter referred to, detached, with a shear-plate in place; Fig. 4, a central longitudinal sectional elevation of said shear-plate, detached; Fig. 5, an enlarged top-plan view of a part of the tripping mechanism hereinafter referred to; Fig. 6, a top-plan view of a modified form of my shearing mechanism, and Fig. 7 an end-view of the same.

Like numerals indicate like parts throughout the drawings.

In the drawings, 1 is the base of a glass-pressing machine, carrying a horizontally revoluble table 2, and upon which the glass molds 3 are disposed and arranged to be presented successively to the glass-pressing mechanisms in the usual or in any preferred manner. Springing from the base of the machine is a stout bracket 4, curved outwardly and upwardly to clear the edge of the revolving table. At its upper end, the bracket carries a horizontal plate 5 having and being supported by a downwardly projecting arm $5^a$ vertically adjustable upon the bracket 4 by means of the set-screws $5^b$. The bracket and the plate 5 are located at the point in the rotation of the table at which the glass is charged into the molds. Through the plate 5 is a hole which at this point exactly coincides with the openings into the respective molds as they move with the table beneath the plate 5. At opposite margins of the plate 5 are upwardly projecting flanges or guides $5^c$ between which, and upon the top of the plate 5, slides a flat rectangular plate 6 having therethrough an opening $6^a$ which receives with a loose fit a shear-plate 7. Through the shear-plate 7 is a downwardly flaring hole $7^a$. The upper surface of the shear-plate is,—surrounding the hole,—slightly elevated and the meeting angle of this surface with the beveled side of the hole $7^a$ forms a sharp shearing edge $7^b$. (See Fig. 4.)

8 is a knife or shear-blade, the extremities of which are secured, as at $8^a$, to the top of the flanges $5^c$ of the plate 5. The blade 8 extends diagonally across the top of plate 7 and the under side of the blade is in contact with the elevated surface surrounding the hole 7ᵃ. It will be seen that when the plate 7 is moved so that the hole 7ᵃ is closed at bottom by the top of the plate 5, the hole 7ᵃ now forms a pocket or cavity of definite dimensions and which will hold a given quantity of glass. The plate 7 is interchangeable and is readily removable from its recess in plate 6. Thus my cut-off may be used for articles of different sizes by merely employing a plate 7 having a cavity of exactly the proper size to receive the requisite quantity of glass. To permit the use of molds of different heights, the plate 5 may, by means of the adjusting nuts 5ᵇ, be raised and lowered to such heights as to barely permit the passage of the molds under the plate. It will also be seen that when the hole 7ᵃ in plate 7 is moved out of alinement with the hole through plate 5 and the cavity 7ᵃ is filled with glass, now if the plate 7 be moved so that the cavity 7ᵃ is brought into alinement with the hole through the plate 5 and with the open top of the mold, any excess of glass projecting above the top of the plate 7 will be sheared off by the joint action of the edge 7ᵇ and the blade 8, and that the charge of glass will instantly drop through the opening in plate 5 into the open mold. The downwardly flaring sides of the opening 7ᵃ prevents the charge of glass from sticking in the plate.

The shearing movement of the plate 7 in harmony with the rotation of the mold-carrying table is obtained as follows: Formed upon the plate 6 is a rearwardly projecting arm 6ᵇ which carries at 6ᶜ a vertically adjustable stud 9. Pivoted to the table, as at 10, is an arm 11 arranged to swing horizontally upon the table. The arm 11 carries a vertical bar 12 which is held in vertical adjustment by means of set-screw 13. This upwardly projecting bar lies in the circular path of the downwardly projecting stud 9. When, by the rotation of the table, the stud 9 is caught by the bar 12, the plate 6, and with it the shearing plate 7, slide upon the plate 5, and the charge of glass is now sheared off from the gathering iron, and the pocket or cavity 7ᵃ is filled with glass. At the end of this cut the opening into the top of the mold is clear, as above described, and the mold is now in exact position to receive the charge from the pocket 7ᵃ.

The release of the engaged members 9 and 12 is effected as follows: The arm 11 has a downwardly and outwardly projecting extension 11ᵃ having at its extremity a hook 11ᵇ. Secured to the bracket 4 is an arm 14 having at its outer end a hook or stop 14ᵃ which lies in the path of the hook 11ᵇ on the arm 11 and is so positioned that the two hooks come into engagement at the instant the cutting off operation is completed. As the table continues to revolve, the wedge-like action of the rigid hook 14ᵃ upon the pivoted hook 11ᵇ causes the arm 11 to swing inwardly, thus disengaging the two hooks as well as the stud 9 and the bar 12. The plate 6 has a rearwardly projecting rod 15 engaged by a compression spring 16 which abuts against lug 5ᵈ projecting upwardly from the end of the plate 5. When the arm 11 is tripped, as just described, the spring 16 retracts the plates 6 and 7 to their original position. The outward swing of the arm 11 is limited by a stop 17 and its inward swing by a stop 18. A spring 19 holds the arm 11 pressed normally outward with the parts 6ᶜ and 12 in circular alinement but permitting the tripping and inward swing of the arm.

In Fig. 6 I have shown a modification of my shearing device in which, in addition to the fixed blade 8, I employ a movable blade 20, pivoted at one end, as at 21, to the flanges 5ᵉ and at its other end slidably connected, as at 22, with the plate 6. The two blades being disposed at an angle to each other, with the opening 7ᵃ between the cutting edges, the cutting operation will be performed by the movement of the plate 6, as above described.

Various modifications of shears will suggest themselves to those skilled in the art and I do not, therefore, limit my shears to the specific forms here, by way of illustration described.

Having described my invention, what I claim and desire to secure by Letters Patent is—

1. In a device of the described character, a revoluble table adapted to carry a glass-mold, a stationary plate having therethrough an opening in alinement with the opening into such glass-mold, a spring-controlled shear-plate mounted and slidable upon the stationary plate and having therethrough an opening adapted to move into and out of coincidence with the opening first mentioned, a blade disposed in operative relation to the shear-plate, means upon the table for engaging and moving the shear-plate upon its support and a tripping mechanism for releasing the shear-plate from such engagement.

2. In a device of the described character, a plate having an aperture therethrough, a shear-plate mounted and slidable upon the plate first mentioned and having therethrough a downwardly flaring aperture, the arrangement being such that said flaring aperture may be moved into and out of coincidence with the aperture first mentioned, a blade secured to the plate first mentioned and in operative relation to the shear-plate and a spring connected with said two plates and which holds the shear-plate normally retracted, combined with a table adapted to present a glass-mold with its mouth to the aperture first mentioned, means upon the table for actuating the shear-plate, and a tripping mechanism for releasing the shear-plate from connection with the table.

In testimony whereof I affix my signature in presence of two witnesses.

NOBLE W. HARTMAN.

Witnesses:
 CLAYTON MURPHY,
 LEONA KIBURTZ.